Figure 1:
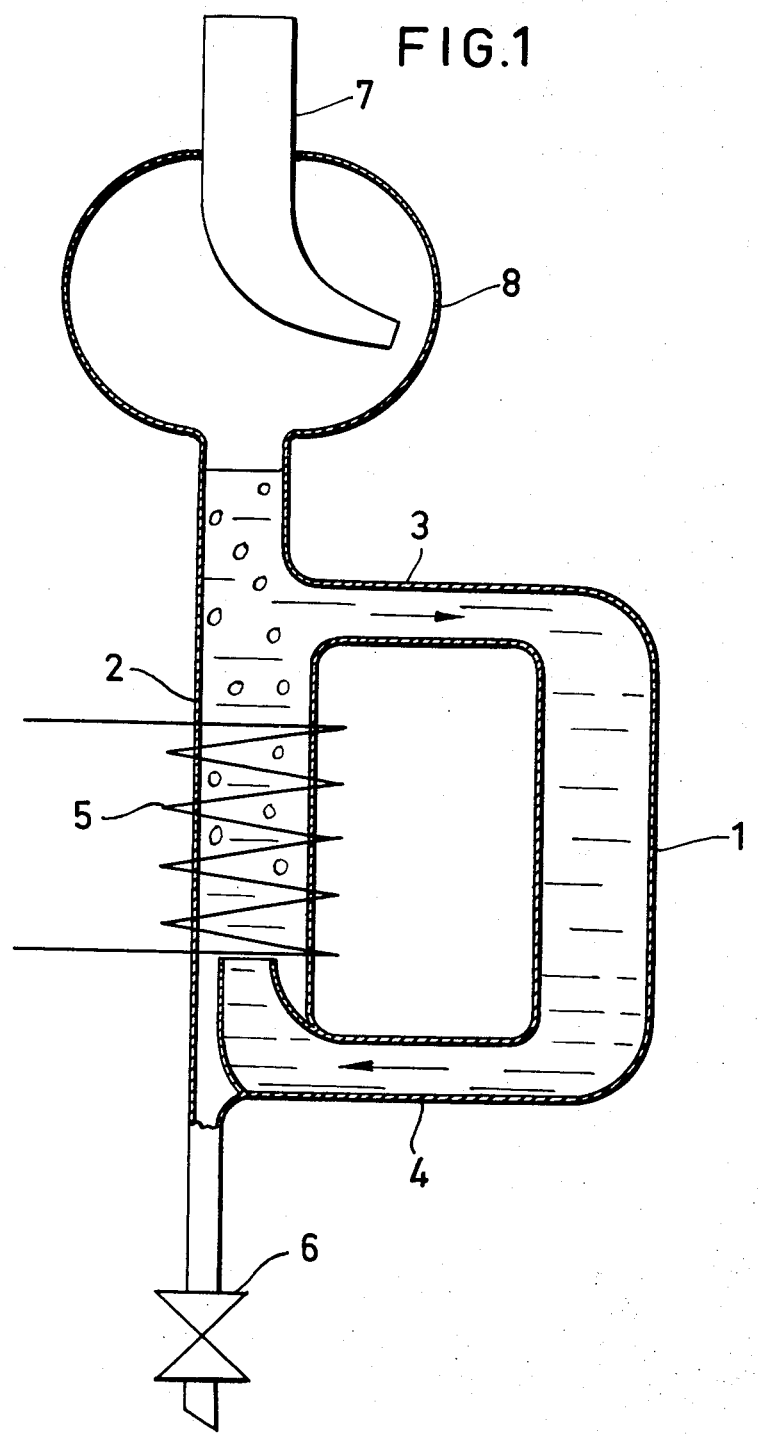

United States Patent [19]
Jonsson

[11] 3,709,616
[45] Jan. 9, 1973

[54] MEASURING VESSEL FOR PHOTOMETRIC ANALYSIS OF A LIQUID, IN WHICH GAS BUBBLES ARE DEVELOPED

[75] Inventor: Per Hjalmar Jonsson, Safe, Sweden

[73] Assignee: Rederiaktiebolaget Nordstjernan, Stockholm, Sweden

[22] Filed: Jan. 27, 1971

[21] Appl. No.: 110,103

[30] Foreign Application Priority Data

Jan. 30, 1970 Sweden ................................1209/70

[52] U.S. Cl. ................................................356/246
[51] Int. Cl. ................................................G01n 1/10
[58] Field of Search ........................................356/246

[56] References Cited

UNITED STATES PATENTS

| | | | |
|---|---|---|---|
| 3,307,447 | 3/1967 | Carleton et al. | 356/246 UX |
| 3,319,512 | 5/1967 | Isreeli | 356/246 X |
| 3,345,910 | 10/1967 | Rosin et al. | 356/246 X |
| 3,480,784 | 11/1969 | Pierce | 356/246 UX |
| 3,512,398 | 5/1970 | Hrdina | 356/246 X |
| 3,514,210 | 5/1970 | Hrdina | 356/246 |
| 3,516,752 | 6/1970 | Hrdina | 356/246 |
| 3,520,517 | 7/1970 | Hrdina | 356/246 |
| 3,560,099 | 2/1971 | Boe et al. | 356/246 |
| 3,580,686 | 5/1971 | Coulter | 356/246 |

OTHER PUBLICATIONS

Boyer, West. Elec. Tec. Digest, No. 15, July, 1969 pp. 23–25.

Primary Examiner—Ronald L. Wibert
Assistant Examiner—V. P. McGraw
Attorney—Brumbaugh, Graves, Donohue & Raymond

[57] ABSTRACT

In the particular embodiments of the invention described in the specification, photometric examination of a liquid contained in a vessel is carried out while gas bubbles are developed or introduced into the portion of the vessel into which the photometric measurement is carried out. In one embodiment the bubbles are generated by heating the liquid and in another embodiment gas bubbles are generated by introducing a gas into the liquid through a gas inlet.

2 Claims, 2 Drawing Figures

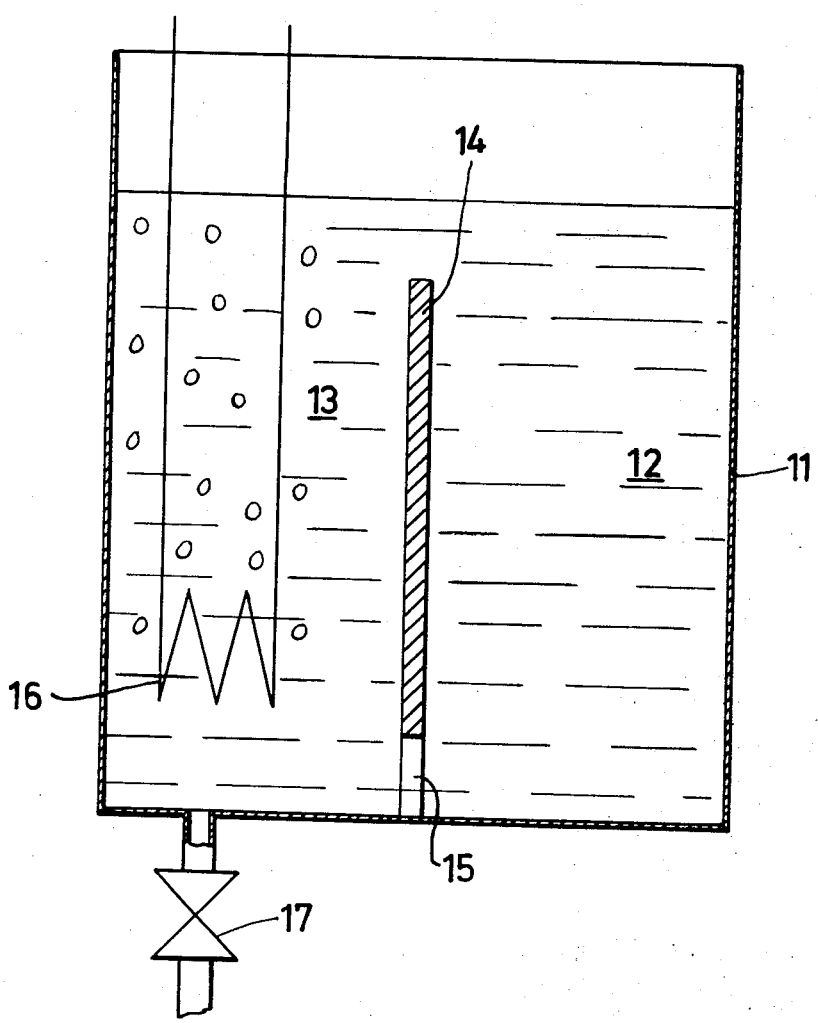

MEASURING VESSEL FOR PHOTOMETRIC ANALYSIS OF A LIQUID, IN WHICH GAS BUBBLES ARE DEVELOPED

In photometric measurements on liquids it is in most cases of great importance that the liquid layer, through which measurements are carried out, has a constant thickness so that reproducible measuring results are obtained in accordance with Beer's law for light absorption. Therefore, one tries to avoid as much as possible that gas bubbles occur in the measuring section as these seriously disturb the measurements. If each gas bubble is small in comparison to the length of the measuring section, and appears for a short time, one may sometimes compensate for the disturbances by using a photo detector with a time constant which is large in comparison to the time, during which each individual gas bubble is present. In this way an "equalized" measuring value is obtained, which can be used after calibration.

This method, however, cannot be used if the development of gas is so heavy that the light beam used in the measuring instrument is blocked for most of the time by a great number of gas bubbles. The most immediate solution is here to try to reduce the development of gas, but in several cases, for instance in the examination of a reaction between a liquid and a gas, it is difficult or impossible to restrict the amount of gas bubbles. In order to carry out photometric measurements with any degree of accuracy in this case also, other measures must be taken. A possible way is to achieve that the development of gas and the photometric measurement take place in different zones in the measuring vessel used. The present invention is based on this principle.

The present invention relates to a measuring vessel for photometric investigations of a liquid, in which a gas is developed or introduced, and is characterized in that the photometric measurements and the development or introduction of the gas are obtained in different parts of the measuring vessel through the design of the vessel, these parts, however, being connected to each other so that the gas flow causes mixing of the liquid.

The measuring vessel of the invention may preferably have an annular shape with two branches or legs, where the development or introduction of the gas proceeds in one branch and the photometric measurements are carried out in the other. By the motion of the gas bubbles the liquid phase will be circulated in such manner that an effective mixing is achieved. The measuring vessel must of course be provided with suitably arranged inlets and outlets for liquid and gas.

In the drawing an example of a design of a measuring vessel according to the invention is shown. Here the measuring vessel has the shape of a square with rounded corners but other similar embodiments are of course also possible. The vessel has two vertical branches 1 and 2, which are connected by the cross conduits 3 and 4. The photometric measurements are carried out in the branch 1, while the development of gas is achieved in the branch 2. In the drawing a heating device 5 is shown, by means of which the liquid is brought to boil in the branch 2, but other means for the development of gas are also possible. Thus, an inlet for gas or for a substance, which produces development of gas in the liquid, may be used instead of or together with the heating device. For drawing off the liquid an outlet with a valve 6 is provided, and for the supply of liquid and carrying away of gas an inlet 7 is provided, optionally in combination with splash trap 8. The cross conduit 4 may as shown in the drawing be somewhat elongated and extend a little into the branch 2. In this way an ejector effect can be obtained, which improves the flow. This design is however not absolutely necessary, as a flow is also obtained with a connection of the cross conduit 4 without any extension.

A still more simple design of the measuring vessel of the invention is also possible. This appears from FIG. 2 of the drawing. Here the measuring vessel is designed as an open vessel 11, which is divided into two portions 12 and 13 by the partition 14. The partition does not extend up to the surface of the liquid and is at its lower portion provided with one or more apertures 15 so that the two portions of the vessel in this way are connected to each other over and under the partition. If gas is to be developed by boiling the liquid, this can be achieved by an immersion heater 16 or any other suitable device. ALso, this heating device may of course be replaced or supplemented with an inlet for gas or a gas developing substance. The photometric measurements are carried out in the portion 12 of the vessel, which for this purpose is designed in a suitable way, which is determined by the measuring equipment used. For drawing off liquid the vessel is provided with an outlet with a valve 17. Supply of liquid and carrying away of gas can take place directly from or to the surroundings respectively, or the vessel may be covered at its upper portion and provided with suitable inlet and outlet means.

In the most simple embodiment of a measuring vessel, even the partition can be eliminated. In that case the heating or gas developing devices are designed or adapted in such a way that the gas is only developed in a portion of the vessel and is not mixed with all the contents of the vessel. If for instance a heating device with relatively small dimensions is placed strongly excentrically in the vessel, the bubbles formed in boiling will not be mixed into the whole vessel, but the liquid phase is stirred and an even temperature in the whole vessel is achieved.

A measuring vessel according to the invention can be used in many applications. Some examples of such applications are as follows:

1. Study of a reaction between a liquid and a gas or a compound developing gas.
2. Study of reaction processes wherein a liquid is boiled.
3. Study of reaction processes wherein a liquid is stirred by blowing gas into the liquid.
4. Study of a reaction, in which gas is developed, the development of gas being initiated in one portion of the measuring vessel.

It is also possible to use a measuring vessel in accordance to the invention for automatized or continuous measurements. The changes and modifications then necessary for supply lines and outlets are clearly apparent for the expert. The basic design of the measuring vessel remains unchanged in any case. For instance, valves for supply and carrying away of liquid may be controlled by means of motors, which receive impulses according to a pre-set program, which also actuates initiation of the development of gas. In this way the measuring vessel may for instance be used for automatic water analysis, the chemical oxygen demand of the water being determined by boiling a sample with an acid dichromate solution and the content of trivalent chromium ions formed then being determined photometrically.

I claim:

1. An apparatus for photometric examination of a liquid, comprising:
   a. a vessel for the liquid divided into two portions which are connected to each other at their opposite ends;
   b. a heating device for providing a gas in the liquid in one portion; and
   c. means for photometric measuring of the liquid in the other portion.

2. An apparatus for photometric examination of a liquid, comprising:
   a. a vessel for the liquid divided into two portions which are connected to each other at their opposite ends;
   b. a gas inlet for providing a gas in the liquid in one portion; and
   c. means for photometric measuring of the liquid in the other portion.

* * * * *